United States Patent
Hartsock

(10) Patent No.: US 6,953,200 B2
(45) Date of Patent: Oct. 11, 2005

(54) CART FOR CRYOGENIC LIQUID CYLINDER

(75) Inventor: William M. Hartsock, Horseheads, NY (US)

(73) Assignee: ATNL, Inc., Wilmington, DE (US)

( * ) Notice: Subject to any disclaimer, the term of this patent is extended or adjusted under 35 U.S.C. 154(b) by 0 days.

(21) Appl. No.: 10/799,311

(22) Filed: Mar. 12, 2004

(65) Prior Publication Data

US 2004/0183268 A1 Sep. 23, 2004

Related U.S. Application Data

(60) Provisional application No. 60/455,373, filed on Mar. 17, 2003.

(51) Int. Cl.$^7$ .................................................. B62B 3/10
(52) U.S. Cl. ..................................................... 280/79.5
(58) Field of Search ............................. 280/79.5, 79.6, 280/47.26, 47.27, 47.28, 79.4, 651, 652, 47.24; 414/618, 619, 634, 589, 59, 458, 459, 490, 590

(56) References Cited

U.S. PATENT DOCUMENTS

| | | | | |
|---|---|---|---|---|
| 2,583,196 A | * | 1/1952 | Zander et al. ............ | 280/47.35 |
| 2,611,622 A | * | 9/1952 | Kernkamp ................... | 298/27 |
| 3,064,991 A | * | 11/1962 | Huthsing, Jr. ............. | 280/47.24 |
| 3,977,602 A | * | 8/1976 | Kirch ........................ | 239/74 |
| 4,536,123 A | * | 8/1985 | Snyder ....................... | 414/448 |
| 4,738,582 A | * | 4/1988 | Roberts ...................... | 414/546 |
| 5,035,438 A | * | 7/1991 | Cronquist .................. | 280/79.5 |
| 5,145,311 A | * | 9/1992 | Salvucci .................... | 414/592 |
| 5,393,080 A | * | 2/1995 | Ross ........................ | 280/47.26 |
| 5,396,885 A | * | 3/1995 | Nelson ................... | 128/204.18 |
| 5,427,494 A | * | 6/1995 | Fitzgerald .................... | 414/459 |
| 5,489,183 A | * | 2/1996 | Malden et al. .............. | 414/490 |
| 5,860,659 A | * | 1/1999 | Hart .......................... | 280/79.5 |
| 6,027,128 A | * | 2/2000 | Stich et al. .............. | 280/47.16 |
| 6,406,248 B1 | * | 6/2002 | McGill et al. .............. | 414/634 |
| 6,733,017 B2 | * | 5/2004 | Intravatola ................. | 280/79.6 |
| 2002/0114689 A1 | * | 8/2002 | McGill et al. .............. | 414/634 |

OTHER PUBLICATIONS

A photograph of Prior Art cart on the right and Applicant's cart on the left.
"Saf–T–Cart Product Lines Storage Series," Saf–T–Cart, World Wide Web, Feb. 25, 2003.
"Series "ULG" Universal Liquid Gas Cylinder Trucks," Harper Trucks, World Wide Web, Feb. 25, 2003.

* cited by examiner

Primary Examiner—J. Allen Shriver
(74) Attorney, Agent, or Firm—RatnerPrestia

(57) ABSTRACT

A cart is provided for safely transporting and storing a single, large, vertically-oriented, cylindrically-shaped canister having a horizontally-oriented base. The vertical and horizontal orientations of the canister and its base, respectively, are constantly maintained throughout the transporting and storing of the canister. The cart includes a stable base. The stable base includes a bottom platform and four wheels operatively connected to the stable base and configured to support the weight of the canister. The stable base is configured to receive and support the horizontally-oriented base of the canister. The cart further includes two side rails extending upwardly from the stable base. A circumferential band is removably attached to the side rails and is configured to encircle and secure from movement the canister, within the cart. The band is at an elevation above the horizontally-oriented base of the canister.

6 Claims, 5 Drawing Sheets

CART FOR CRYOGENIC LIQUID CYLINDER

This application is related to and claims the benefit of U.S. Provisional Application No. 60/455,373 entitled CART FOR LARGE CANISTER filed on Mar. 17, 2003.

FIELD OF THE INVENTION

This invention relates to a cart for transporting, handling, and storing a large canister or cylinder, and more particularly to a cart for safely holding a large liquid canister to reduce handling and to help prevent the canister from shifting, tipping, or crushing an operator during transport and handling.

BACKGROUND OF THE INVENTION

Reusable liquid and gas canisters or cylinders 2, as shown in FIGS. 1A and 1B, are used to store cryogenic liquids or gasses for industrial use. These canisters or cylinders are filled with liquid and transported to an industrial site for use and storage. When the liquid is depleted, the canisters are then transported to a liquid supplier and refilled. These canisters or cylinders typically weigh from 600 to 900 pounds or more when full, and must be handled with care to ensure the safety of persons transporting and handling them.

One device for transporting large liquid cylinders is a liquid cylinder truck 4, as shown in FIGS. 1A and 1B. FIG. 1A illustrates the cylinder truck 4 in its upright, standing position, while FIG. 1B illustrates the cylinder truck 4 in its tilted position for movement of the liquid cylinder 2. The liquid cylinder truck 4 includes a lifting platform (not shown) which is positioned under the cylinder 2 by tilting the cylinder 2 onto an edge of its base 2A. A spring loaded hanger 6 is connected to the cylinder 2 at its handling ring or halo 8. An operator holds a handle 10 and rocks the cylinder truck 4 back on its wheels 12, as illustrated in FIG. 1B, to transport the cylinder 2. Rear casters 14 may be provided to prevent the cylinder 2 from rocking too far and tipping onto the operator. Maneuvering the cylinder 2, which can weigh in excess of 900 pounds, can be dangerous for operators. Any shifting of the cylinder 2 can trap and crush fingers, hands, arms, legs, or other body parts of the operator against the ground, walls, or other objects. Furthermore, the cylinder truck 4 is only supported by two wheels 12 during transport, and consequently may not be stable on inclined or difficult terrain. Finally, the spring loaded hanger 6 can become disengaged, causing the operator to lose control of the cylinder 2.

Accordingly, there exists a need for an apparatus and method for transporting, handling, and storing large liquid cylinders or canisters that provide increased operator safety.

SUMMARY OF THE INVENTION

According to one aspect of this invention, a cart is provided for safely transporting and storing a single, large, vertically-oriented, cylindrically-shaped canister having a horizontally-oriented base. The vertical and horizontal orientations of the canister and its base, respectively, are constantly maintained throughout the transporting and storing of the canister. The cart includes a stable base. The stable base includes a bottom platform and four wheels operatively connected to the stable base and configured to support the weight of the canister. The stable base is configured to receive and support the horizontally-oriented base of the canister. The to cart further includes two side rails extending upwardly from the stable base. A circumferential band is removably attached to the side rails and is configured to encircle and secure from movement the canister, within the cart. The band is at an elevation above the horizontally-oriented base of the canister.

According to another aspect of this invention, a canister assembly is provided for safely transporting and storing a large volume of liquid. The assembly includes a cart and a vertically-oriented, cylindrically-shaped canister having a horizontally-oriented base. The cart includes a stable base and four wheels operatively connected to the stable base and configured to support the weight of the canister. Two side rails extend upwardly from the stable base, and a circumferential band is removably attached to the side rails. The band is configured to encircle and secure from movement the canister, within the cart. The band is at an elevation above the horizontally-oriented base of the canister. The canister is positioned on the stable base and configured to retain the volume of liquid. The vertical and horizontal orientations of the canister and its base, respectively, are constantly maintained throughout the transporting and storing of the canister.

According to yet another aspect of this invention, a method is provided for safely transporting and storing a single, large, vertically-oriented, cylindrically-shaped canister having a horizontally-oriented base. An empty canister is raised utilizing an industrial lifting device, and the canister is positioned above a cart. The canister is lowered onto a stable base of the cart, wherein the stable base includes four wheels. The canister is encircled with a circumferential band, and the circumferential band is attached to the cart to form a canister assembly. The canister is filled with liquid. The canister assembly is then manually pushed, and constantly maintained, on all four wheels to a desired location for use and/or storage. The vertical and horizontal orientations of the canister and its base, respectively, are constantly maintained throughout the transporting and storing of the canister.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1A:
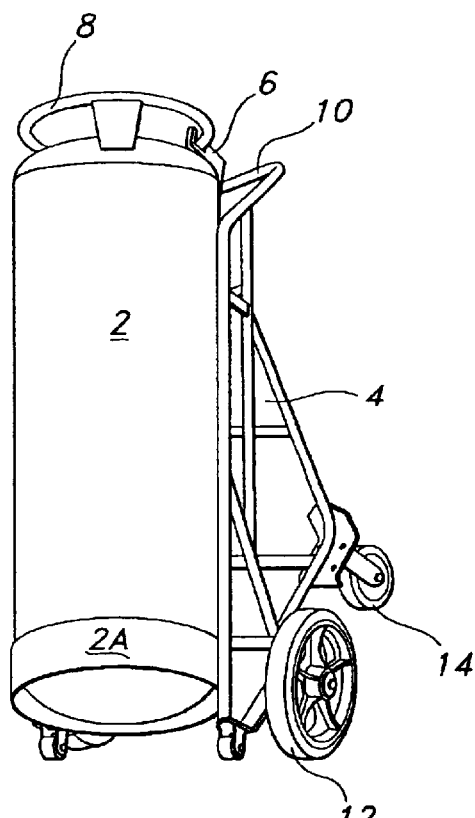
FIG. 1A is a perspective view of a liquid cylinder truck in its upright, standing position, in accordance with the prior art.
Figure 1B:
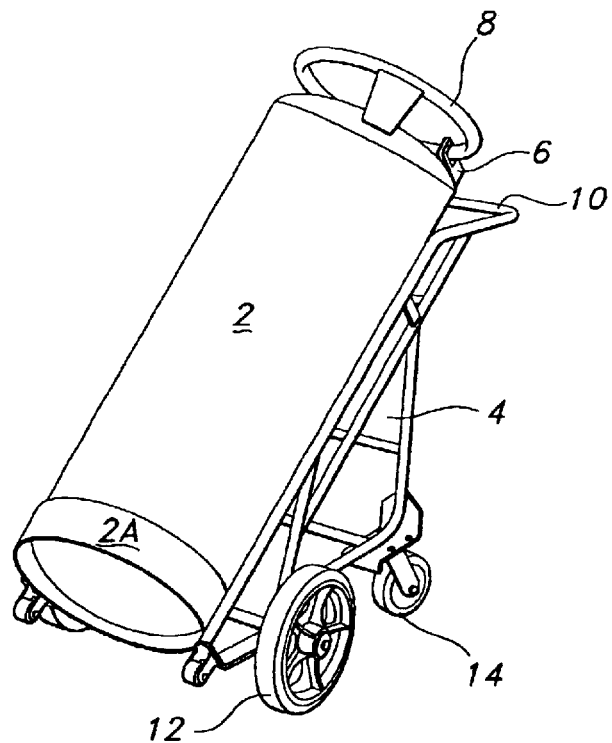
FIG. 1B is a perspective view of the liquid cylinder truck of FIG. 1A in its tilted position for movement of a cylinder.
Figure 2:
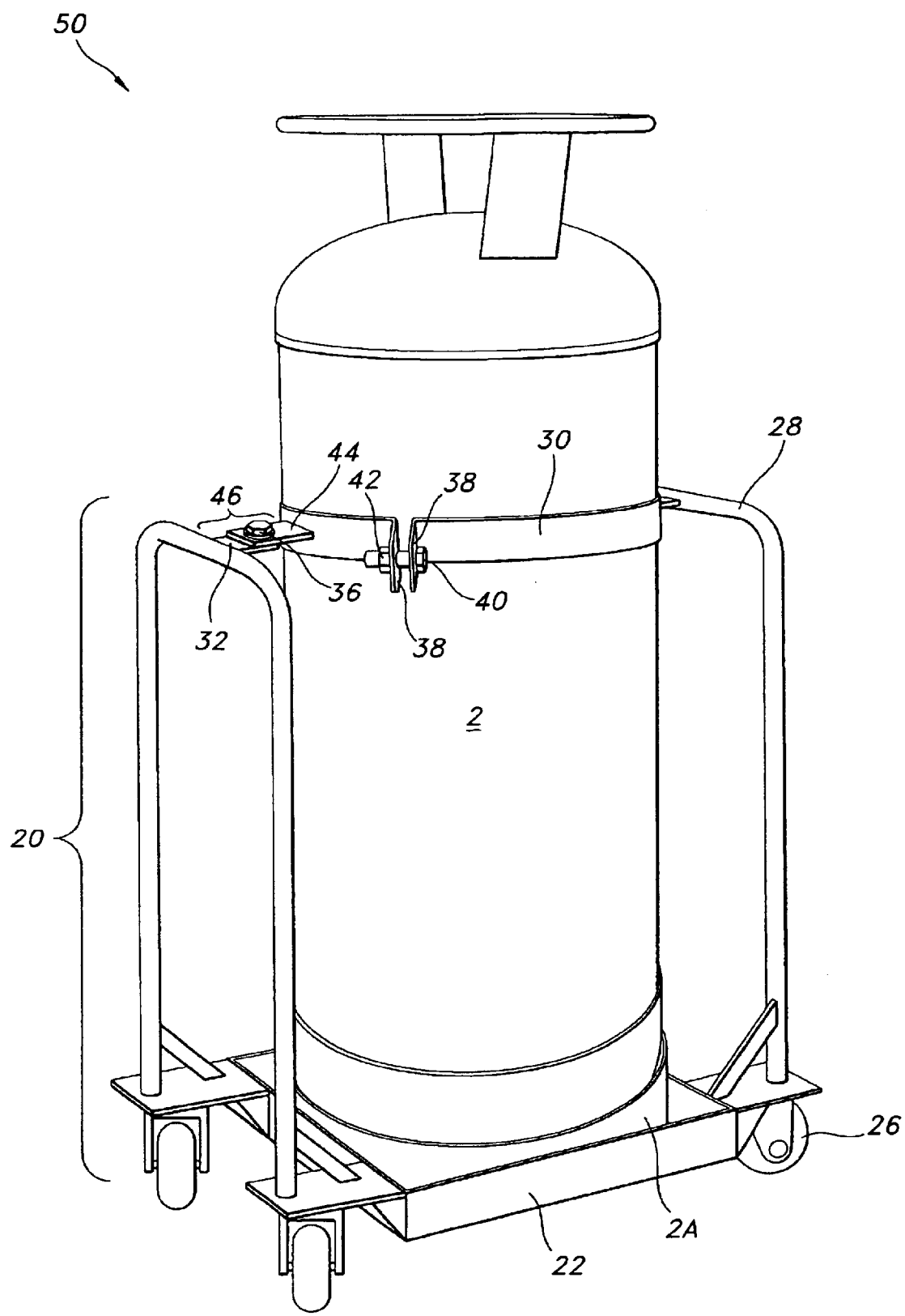
FIG. 2 is a perspective view of a canister assembly including a cart and a canister in accordance with the present invention.

Referring to FIG. 2, there is shown a cart assembly 50 for safely transporting and storing a large volume of liquid. The cart assembly 40 includes a cart 20 and a vertically-oriented, cylindrically-shaped canister 2 having a horizontally-oriented base 2A. The vertical and horizontal orientations of the canister 2 and its base 2A, respectively, are constantly maintained throughout the transporting and storing of the canister 2. The cart 20 includes a stable base 22. The stable base 22 includes a bottom platform 24 (best seen in FIG. 3) and four wheels 26 operatively connected to the stable base 22 and configured to support the weight of the canister 2. The stable base 22 is configured to receive and support the horizontally-oriented base 2A of the canister 2. The cart 20 further includes two side rails 28 extending upwardly from the stable base 22. A circumferential band 30 is removably attached to the side rails 28 and is configured to encircle and secure from movement the canister 2, within the cart 20. The band 30 is at an elevation above the horizontally-oriented base 2A of the canister 2.

Figure 3:
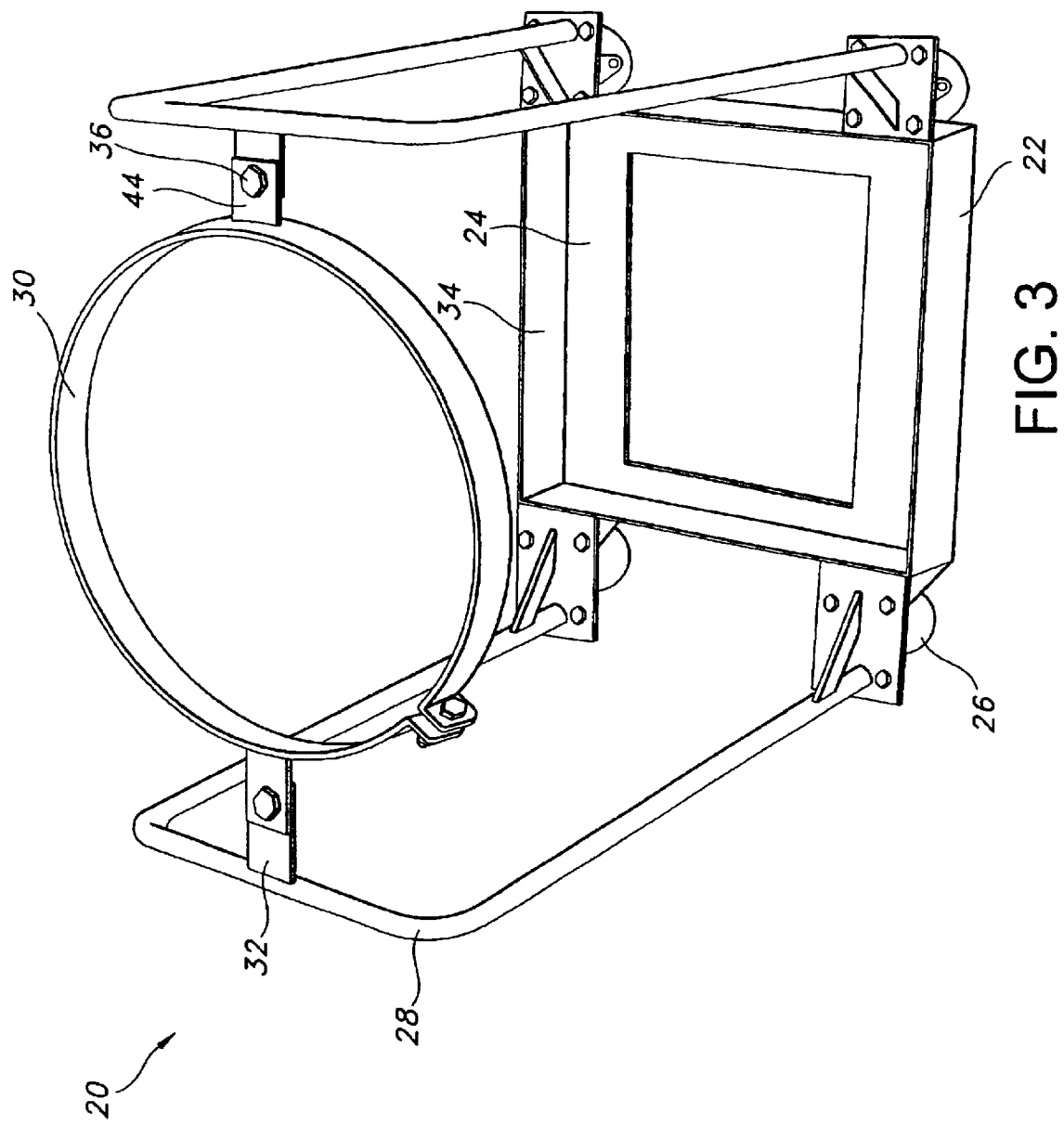
FIG. 3 is an elevated perspective view of the cart of FIG. 2.

FIG. 3 illustrates the cart 20 without the canister 2. The side rails 28 are permanently attached to the stable base 22 of the cart 20. Each of the side rails 28 includes a receiving tab 32 for attaching the band 30 the side rails 28, as will be described in greater detail subsequently with respect to FIG. 4.

The stable base 22, in conjunction with its bottom platform 24, may be configured to provide a recess 34 for receiving canister 2. The recess 34 guides and retains the base 2A of the canister 2. The recess 34 also allows the canister 2 to rest at a lower elevation than is feasible without the recess 34, enhancing the stability of the cart 20. In the exemplary embodiment illustrated in FIGS. 2, 3, and 5, the stable base 22 provides about three inches of clearance from the ground. This clearance allows the cart 20 to be maneuvered over typical terrain in industrial locations, while providing favorable stability.

The stable base 22 is preferably rectangular in shape to facilitate loading a plurality of carts 20 into a truck and to maximize storage space. The bottom platform 24 may be made from 304 stainless steel, which allows the cart 20 to be used in close proximity to a Magnetic Resonance Imaging system (MRI). The present invention, however, is not limited to a stainless steel bottom platform 24, and may include a bottom platform 24 made from any structural material having sufficient strength to support a full canister weighing 900 pounds or more.

The wheels 26 of the cart 20 are preferably located at the corners of the stable base 22. The present invention, however, is not limited to wheels as rolling means. For example, the cart 20 may include four casters configured as two four-inch wheels that swivel at a steering end of the cart 20, and two four-inch wheels that are locked at the other end of the cart 20.

Figure 5:
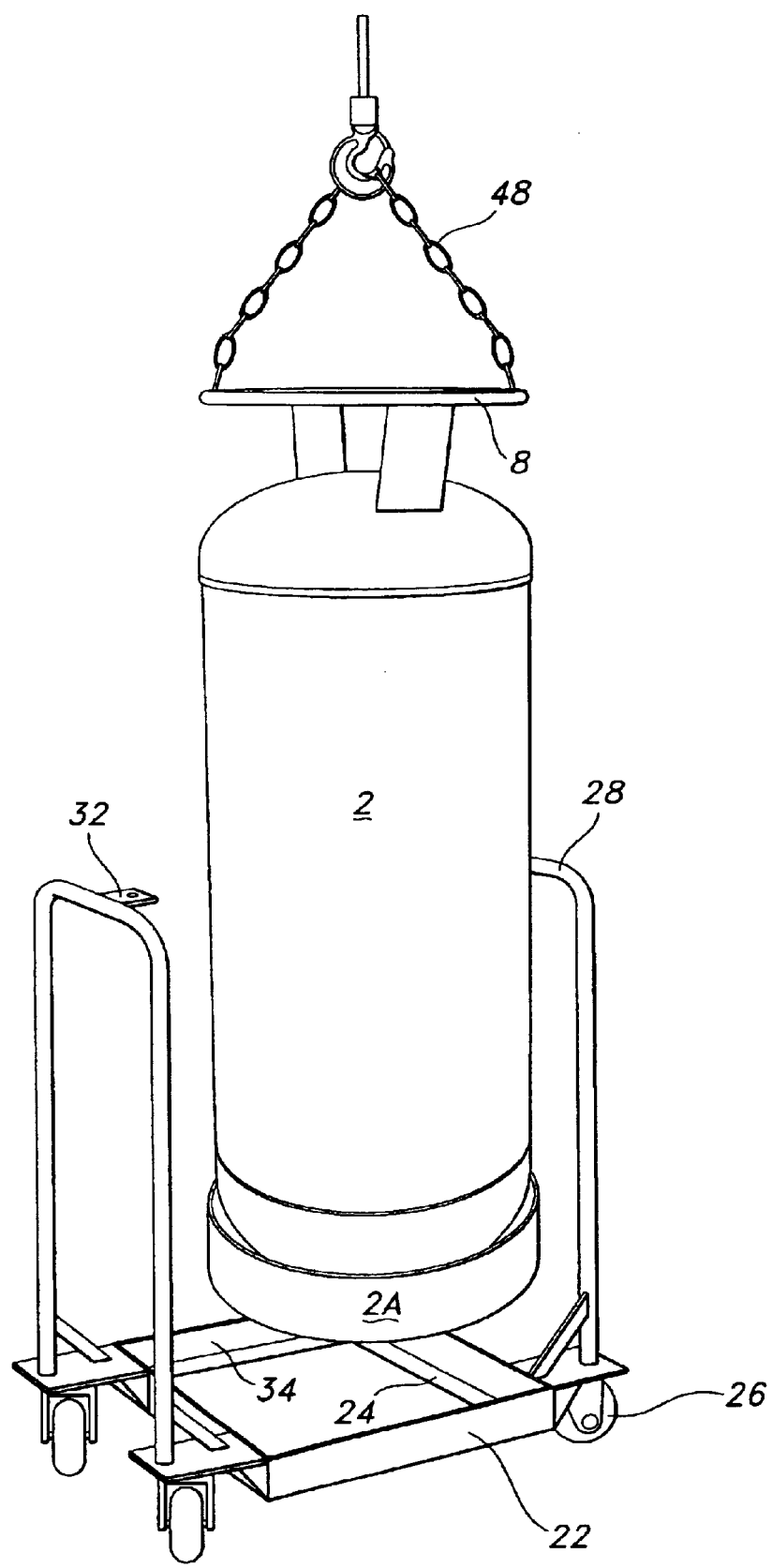
FIG. 5 is a perspective view of the canister assembly of FIG. 2 being assembled.

The side rails 28 extend upwardly from opposite ends of the stable base 22 in a generally vertical orientation. The side rails 28 preferably extend to an ergonomically advantageous height to facilitate handling and transporting. The side rails 28 provide structural support to the circumferential band 30, which secures the canister 2 from movement at an elevation above its base 2A. More specifically, when the band 30 is encircled around the canister 2 and attached to the side rails 28, the canister 2 provides stiffness to the cart 20, further enhancing its stability. The side rails 28 may be made from stainless steel tubing formed in the shape of an inverted "U," as illustrated in FIGS. 2, 3, and 5. The present invention, however, is not limited to side rails 28 made from stainless steel tubing. For example, the side rails 28 may be made from a welded tube assembly, formed bars, or any other structural configuration that accommodates the circumferential band 30 and also provides a hand-hold so that an operator can easily control the cart 20.

Figure 4:
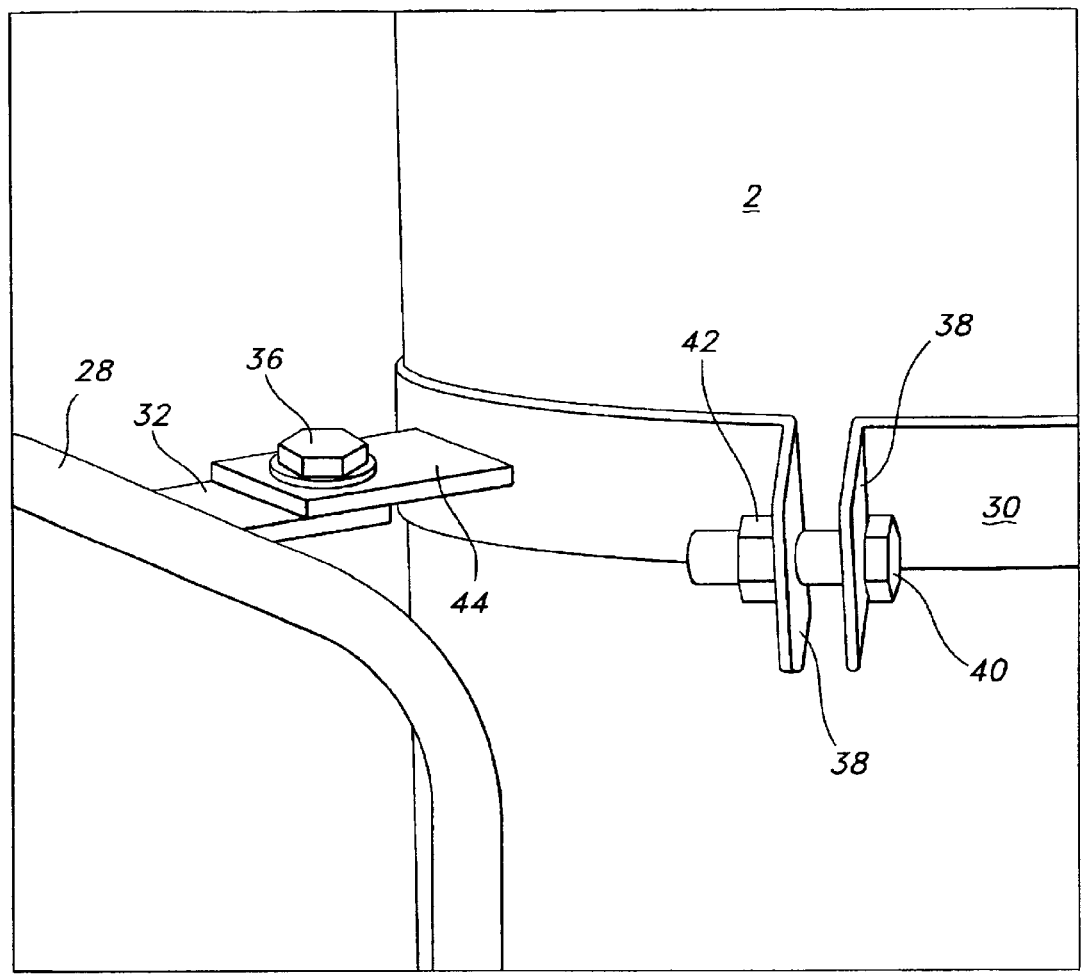
FIG. 4 is a detail perspective view of the cart of FIG. 2, illustrating a band attached to a hand rail.

As best seen in FIG. 4, each of the side rails 28 includes a receiving tab 32 extending inwardly for attaching the band 30 to the side rails 28. An aperture is provided in each of the tabs 32 to receive a fastener 36. The tabs 32 may be welded to the side rails 28. The circumferential band 30 is removably attached to the side rails 28 by the fasteners 36.

The circumferential band 30 is configured to encircle and secure from movement the canister 2. The band 30 terminates in two flanges 38, each of which is configured with an aperture to receive a tightening bolt 40. The tightening bolt 40 is tightened, in conjunction with a nut 42, to draw the flanges 38 together, thereby tightening the band 30 around the canister 2. The present invention, however, is not limited to a nut 42 and bolt 40 combination for tightening means, and may include any fastening device that provides the desired tightening function.

As illustrated in FIG. 3, the circumferential band 30 further includes two mounting tabs 44 permanently affixed to the band 30 and extending outwardly at diametrically opposite locations along the band 30. The circumferential band 30 is removably attached to the side rails 28 by aligning the apertures of the mounting tabs 44 of the band 30 with the respective apertures of the receiving tabs 32 of the side rails 28, and fastening the respective tabs 32, 44 together with the fasteners 36. The tabs 32, 44 define a gap 46 between the canister 2 and each side rail 28, as represented in FIG. 2. Such gaps 46 prevent an operator's fingers or other appendages from being pinched or crushed between the canister 2 and the side rails 28, enhancing operator safety.

The circumferential band 30 is preferably made from a non-magnetic material, such as 304 stainless steel. The present invention, however, is not limited to a circumferential band 30 made from steel, and may include a configuration made from any structural material having sufficient strength to safely secure the canister 2 from movement.

In use, the circumferential band 30 is initially removed from the side rails 28, as illustrated in FIG. 5. An empty canister 2 is raised utilizing an industrial lifting device, and the canister 2 is positioned above the cart 20. In the exemplary embodiment illustrated in FIG. 5, a chain hoist 48 is attached to the handling ring or halo 8 located at the top of the canister 2. Although the halo 8 is configured to support the weight of the canister 2 when full, an empty canister weighs substantially less than a full canister (about 100 to 150 pounds as opposed to 600 to 900 pounds), and is therefore safer to handle than a full canister. The empty canister 2 is lowered into the recess 34 of the stable base 22 until it rests on the bottom platform 24.

The circumferential band 30, with its tightening bolt 40 loosened, is then lowered over the canister 2 to encircle the canister 2. The circumferential band 30 is attached to the side rails 28 by aligning the apertures of the mounting tabs 44 of the band 30 with the respective apertures of the receiving tabs 32 of the side rails 28, and fastening the respective tabs 32, 44 together with the fasteners 36. Similarly, the apertures of the flanges 38 of the band 30 are aligned to receive the tightening bolt 40. The tightening bolt 40 is tightened, in conjunction with a nut 42, to draw the flanges 38 together, thereby tightening the band 30 around the canister 2. Thus, a rigid canister assembly 50 is formed, as shown in FIG. 2, in which the canister 2 itself provides further stiffness to the cart 20. As explained previously herein, the tabs 32, 44 define a gap 46 between the canister 2 and each side rail 28. Such gaps 46 prevent an operator's fingers or other appendages from being pinched between the canister 2 and the side rails 28, enhancing operator safety. Even if one of the tab sets 32, 44 or fasteners 36 were to fail, the other tab set 32, 44 and fastener 36 would maintain each gap 46, enhancing operator safety.

The canister 2 is then typically filled with, for example, a cryogenic liquid. The canister assembly 50, which now weighs 600 to 900 pounds or more, may be manually pushed, and constantly maintained, on all four wheels 26 to a desired location for use and/or storage. The vertical and horizontal orientations of the canister 2 and its base 2A, respectively, are constantly maintained throughout the transporting and storing of the canister 2. In other words, the canister 2 remains in its upright position at all times throughout the operation.

The full canister 2 is safely and easily transported and stored within the cart 20 as cart assembly 50. The stable portability of the cart assembly 50 avoids the inherent dangers associated with the handling, loading, and unloading of a canister via prior art devices such as cylinder trucks. It is contemplated that the canister 2 would remain within the cart 20 for the life of the canister 2. In other words, once a canister assembly 50 is formed, the reusable canister 2 will be used and refilled as necessary, with the canister assembly 50 remaining as a unit. However, the canister 2 can be easily and safely removed from the cart 20, as necessary, for maintenance or repair.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A cart for safely transporting and storing a single, large, vertically-oriented, cylindrically-shaped canister having a horizontally-oriented base, wherein the vertical and horizontal orientations of the canister and its base, respectively, are constantly maintained throughout the transporting and storing of the canister, said cart comprising:

a stable base comprising;
      a bottom platform, and
   four wheels operatively connected by respective four wheel brackets to said stable base and configured to support the weight of the canister, the wheel brackets are rigidly positioned on the stable base, wherein said stable base receives and supports the horizontally-oriented base of the canister at a low center of gravity in which the bottom of the base of the canister is below the top of the wheels;
   two U shaped side rails forming four legs extending upwardly from and rigidly secured to said stable base, each leg being positioned above a respective one of said wheels; and
   a circumferential metal band removably attached to said side rails and configured as a C-clamp to encircle and secure from movement the canister, within said cart, said band at an elevation above the horizontally-oriented base of the canister.

2. The cart of claim 1, wherein each of said two side rails comprises a first tab, said band comprising two second tabs each adapted to engage a respective one of said first tabs, fastening means for rigidly fastening together each first tab with its respective second tab, said first and second tabs being of sufficient dimension to provide a respective gap between side rail and canister to avoid pinching an operator's fingers.

3. The cart of claim 1, wherein said side rails comprise stainless steel tubing.

4. The cart of claim 1, wherein said bottom platform comprises stainless steel plate.

5. The cart of claim 1, wherein said wheels are casters.

6. The cart of claim 1 wherein said stable base has vertical sidewalls extending from said bottom platform to receive the bottom of the canister and prevent sideways movement of the canister.

* * * * *